US010959290B1

(12) United States Patent
Bhattacharyya et al.

(10) Patent No.: US 10,959,290 B1
(45) Date of Patent: Mar. 23, 2021

(54) VENDOR AGNOSTIC SENSOR TELEMETRY DETECTION, PROCESSING, AND IDENTIFICATION

(71) Applicant: Cisco Technology, Inc., San Jose, CA (US)

(72) Inventors: Abhishek Bhattacharyya, Milpitas, CA (US); Abhishek Mukherji, Fremont, CA (US); Balaji Gurumurthy, Milpitas, CA (US); Jenny Marie Yoshihara, Fremont, CA (US); Chayan Bhaisare, Milpitas, CA (US); Prasad Walawalkar, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/599,309

(22) Filed: Oct. 11, 2019

(51) Int. Cl.
*H04W 84/18* (2009.01)
*H04L 12/861* (2013.01)
*H04L 12/26* (2006.01)
*H04W 4/80* (2018.01)
*G06N 20/00* (2019.01)
*G06K 9/62* (2006.01)

(52) U.S. Cl.
CPC .......... *H04W 84/18* (2013.01); *G06K 9/6267* (2013.01); *G06N 20/00* (2019.01); *H04L 43/04* (2013.01); *H04L 43/08* (2013.01); *H04L 49/9042* (2013.01); *H04W 4/80* (2018.02)

(58) Field of Classification Search
None
See application file for complete search history.

(56) References Cited

U.S. PATENT DOCUMENTS

| 10,362,373 | B2 | 7/2019 | Anderson et al. |
| 2008/0119130 | A1* | 5/2008 | Sinha ........................ H04K 3/45 455/1 |
| 2014/0254466 | A1* | 9/2014 | Wurster .................. H04L 51/18 370/312 |
| 2016/0205106 | A1* | 7/2016 | Yacoub ........... H04W 12/04033 726/28 |
| 2016/0328719 | A1 | 11/2016 | Ananchaperumal et al. |
| 2017/0005820 | A1* | 1/2017 | Zimmerman .......... G05B 15/02 |
| 2018/0219879 | A1* | 8/2018 | Pierce ................. H04L 63/1416 |
| 2018/0234266 | A1 | 8/2018 | Rudolph et al. |
| 2018/0234489 | A1 | 8/2018 | Hammons et al. |
| 2019/0281132 | A1 | 9/2019 | Sethuraman et al. |

(Continued)

OTHER PUBLICATIONS

U.S. Appl. No. 16/402,384, Unpublished, filed May 3, 2019, Vasseur et al.

(Continued)

*Primary Examiner* — Kenny S Lin
(74) *Attorney, Agent, or Firm* — Behmke Innovation Group LLC; Kenneth J. Heywood; Jonathon P. Western

(57) ABSTRACT

In one embodiment, a traffic analysis service receives payload data from packets sent by a sensor tag in a network. The service forms a payload signature for the sensor tag, based on the payload data. The payload signature is indicative of one or more bytes in the payload that vary across the packets. The service identifies a portion of the payload data as potentially including a sensor measurement, based on the payload signature. The service uses a machine learning classifier to assign a sensor measurement type to the identified portion of the payload data.

20 Claims, 7 Drawing Sheets

(56) References Cited

U.S. PATENT DOCUMENTS

2019/0363971 A1 11/2019 Mermoud et al.
2020/0249070 A1* 8/2020 Gurumohan ............ A47G 19/00

OTHER PUBLICATIONS

"Azure Digital Twin", Microsof Azure, Sep. 17, 2019, pp. 239-246.
"Eddystone format", online: https://developers.google.com/beacons/eddystone, dated Aug. 28, 2019, printed Sep. 13, 2019, 6 pages.
Rapid7, IOT made real—Using TI SensorTag data with Logentries and NodeRed, https://blog.rapid7.com, dated Feb. 18, 2016, printed Sep. 17, 2019, 10 pages.
"Wireless Medical Telemetry Service (WMTS)", Federal Communications Commission, https://www.fcc.gov/wireless/bureau-divisions/mobility-division/wireless-medical-telemetry-service-wmts, dated Mar. 8, 2017, printed Sep. 13, 2019, 1 page.

* cited by examiner

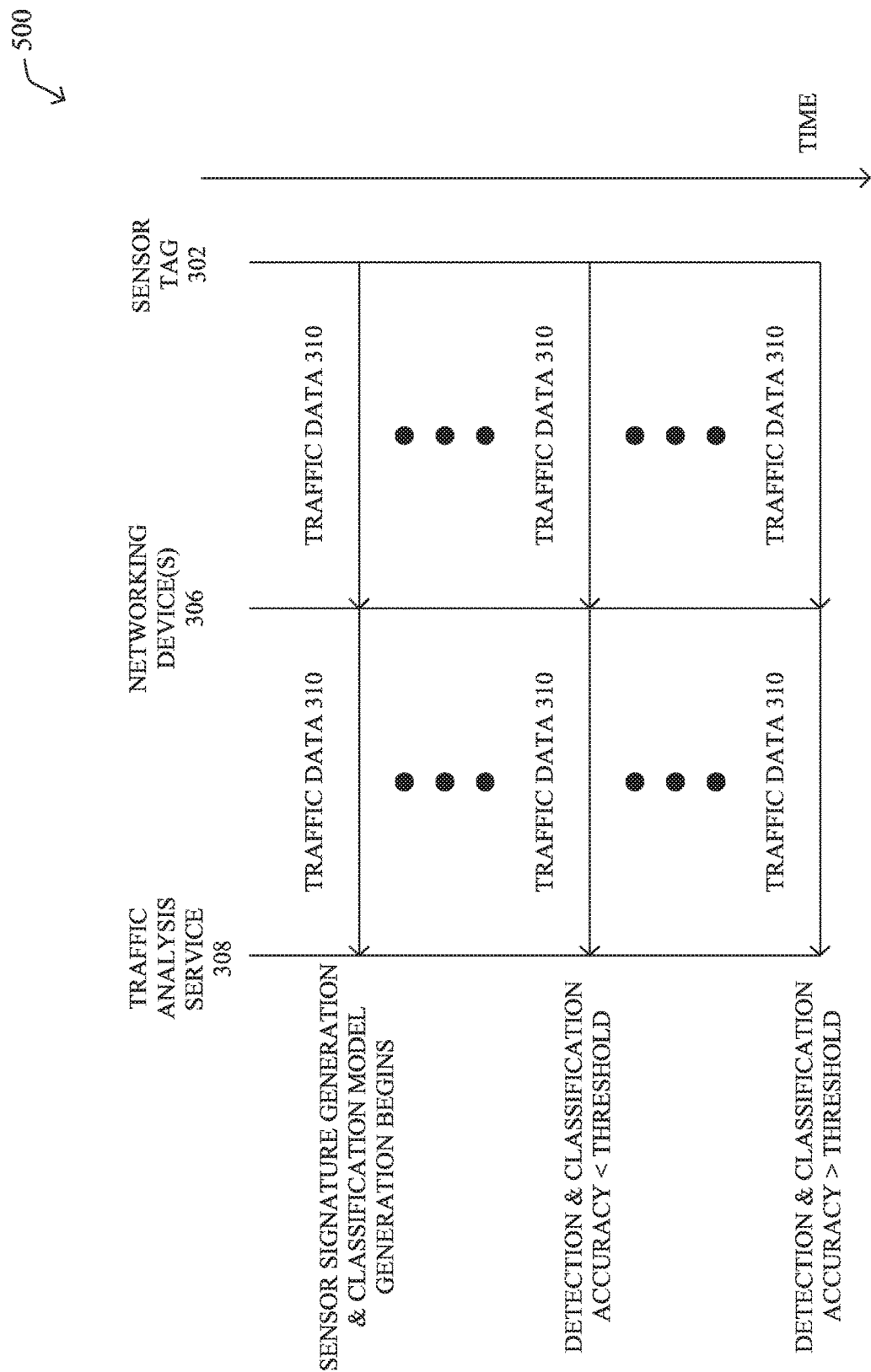

VENDOR AGNOSTIC SENSOR TELEMETRY DETECTION, PROCESSING, AND IDENTIFICATION

TECHNICAL FIELD

The present disclosure relates generally to computer networks, and, more particularly, to vendor agnostic sensor telemetry detection, processing, and identification.

BACKGROUND

An emerging area of interest in the field of computer networking is the "Internet of Things" (IoT), which is used to refer to uniquely identifiable objects/things and their virtual representations in a network-based architecture. In particular, the next frontier in the evolution of the Internet is the ability to network more than just computers and traditional communications devices, but rather the ability to connect "objects" in general, such as lights, appliances, vehicles, window shades and blinds, doors, locks, etc.

As the number of IoT devices continues to grow, the number of device manufacturers has also grown considerably. This is particularly true in the case of wireless sensor tags that simply report sensor readings via the IoT network. For example, an IoT deployment may include any number of tags that repeatedly measure and report the temperature at their corresponding locations.

Unfortunately, very little standardization has occurred with respect to wireless sensor tags, meaning that there are many proprietary data formats in use today. Consequently, sensor measurements from a sensor tag from one manufacturer are often incompatible with applications and devices from another manufacturer, since there is no way for those applications and devices to extract out the measurements from the traffic from the sensor tag.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5B illustrate diagrams for signature and classifier model generation for a traffic analysis service.

DESCRIPTION OF EXAMPLE EMBODIMENTS

Overview

Figure 1:
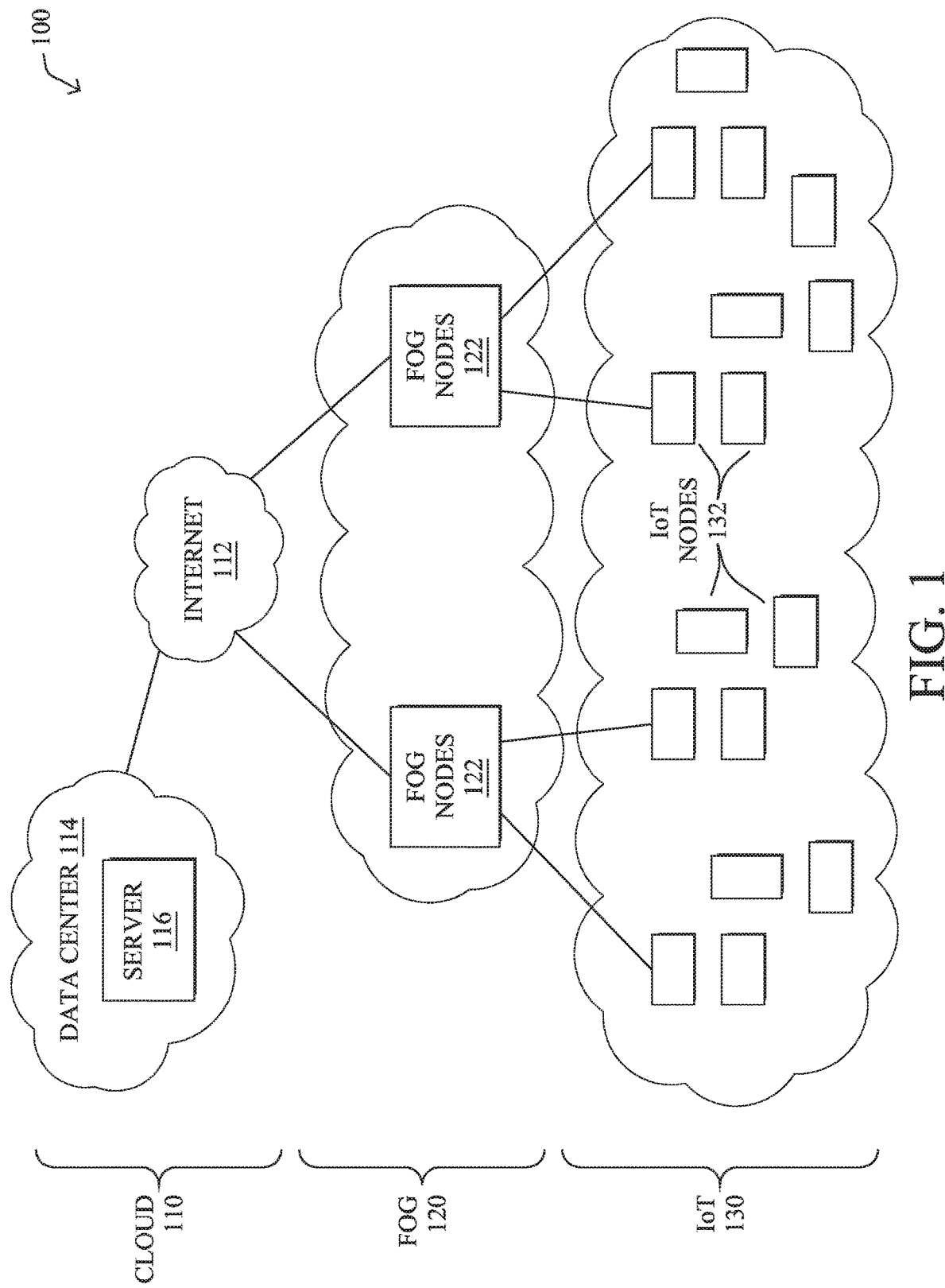
FIG. 1 illustrates an example computer network.

According to one or more embodiments of the disclosure, a traffic analysis service receives payload data from packets sent by a sensor tag in a network. The service forms a payload signature for the sensor tag, based on the payload data. The payload signature is indicative of one or more bytes in the payload that vary across the packets. The service identifies a portion of the payload data as potentially including a sensor measurement, based on the payload signature. The service uses a machine learning classifier to assign a sensor measurement type to the identified portion of the payload data.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
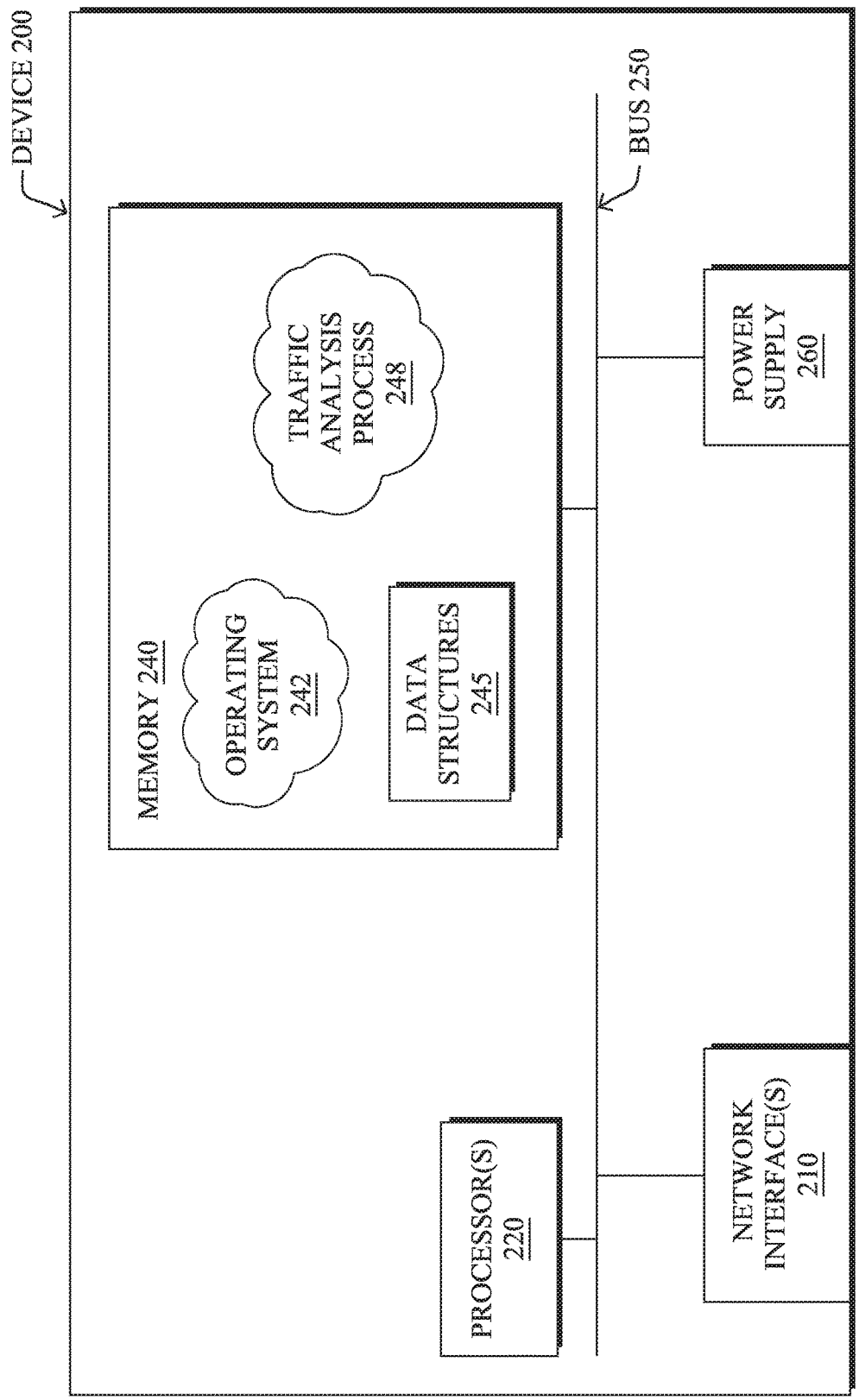
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may be configured to assess the payloads of packets sent by a sensor tag in a network, to detect, identify, and/or process sensor measurements found within the packets. More specifically, traffic analysis process 248 may do so in a manner that is agnostic to the vendor/manufacturer of the sensor tag, meaning that the specific data format used by the vendor/manufacturer does not need to be explicitly known.

In various embodiments, traffic analysis process 248 may employ any number of machine learning techniques, to assess the traffic data sent by a sensor tag. In general, machine learning is concerned with the design and the development of techniques that receive empirical data as input (e.g., data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, traffic analysis process 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample traffic data from a particular type of sensor tag that is known to include one or more sensor measurements. On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured traffic data. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

In some cases, traffic analysis process 248 may assess the captured traffic data on a per-flow or per-packet basis. In other embodiments, traffic analysis process 248 may assess traffic data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

As noted above, the proliferation of the IoT has led to a large number of sensor tags being deployed from a wide variety of vendors/manufacturers. Unfortunately, there has been no standardization in terms of data formats for sensor tags. Consequently, an end user cannot deploy a sensor tag from a given manufacturer without also having to deploy the manufacturer's software. In addition, from the standpoint of the network itself, the proprietary data formats used by sensor tags to report their sensor measurements also leads to low network visibility and prevents cross-vendor interoperability.

Vendor Agnostic Sensor Telemetry Detection, Processing, and Identification

The techniques herein allow for the detection, processing, and identification of sensor telemetry/measurements in a network across any number of different sensor tag manufacturers and data formats. In some aspects, a machine learning-based classifier can be trained to assess a network traffic packet to determine whether the packet was sent by a sensor tag and, if so, identify the sensor measurement(s) present in the payload of the packet. In further aspects, the techniques herein can further be extended to also identify the context of the sensor, such as its location, use, or the like.

Specifically, a traffic analysis service receives payload data from packets sent by a sensor tag in a network. The service forms a payload signature for the sensor tag, based on the payload data. The payload signature is indicative of one or more bytes in the payload that vary across the packets. The service identifies a portion of the payload data as potentially including a sensor measurement, based on the payload signature. The service uses a machine learning classifier to assign a sensor measurement type to the identified portion of the payload data.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Figure 3:
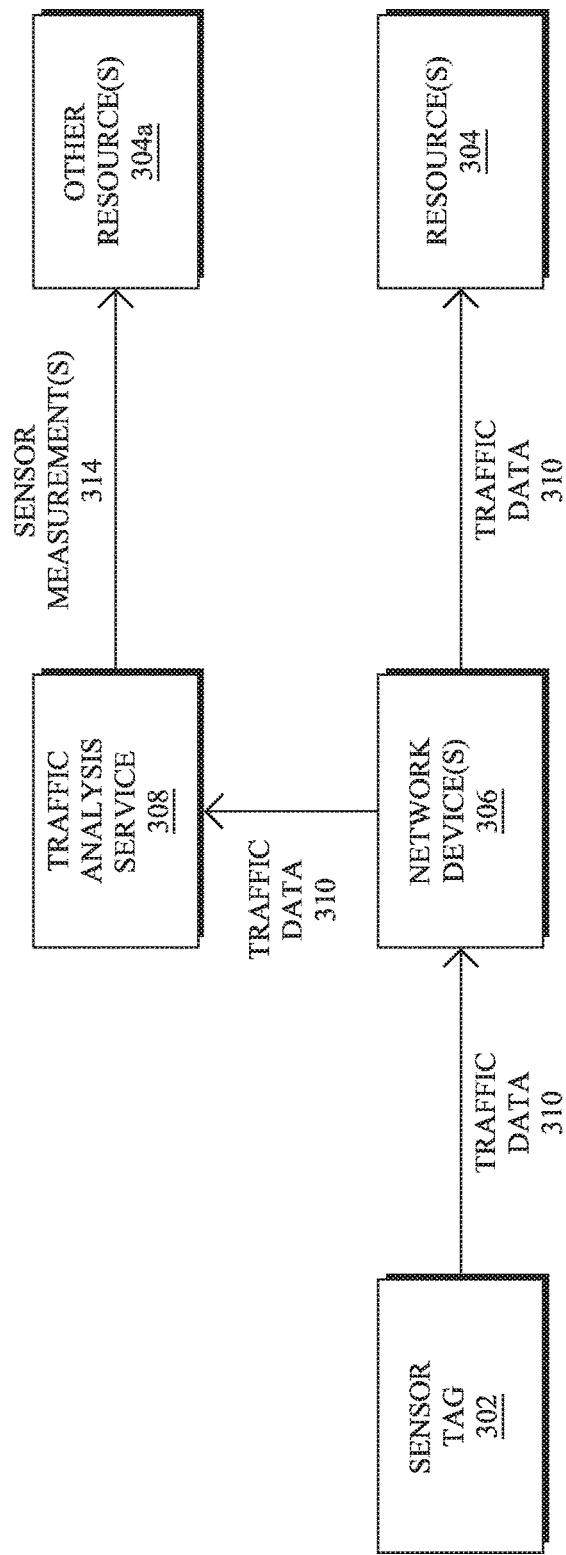
FIG. 3 illustrates an example of a traffic analysis service in a network.

Operationally, FIG. 3 illustrates an example of a traffic analysis service in a network, in various embodiments. As shown, network 300 may generally include a sensor tag 302, any number of resources 304, and any number of networking devices 306 that are configured to provide connectivity between sensor tag 302 and resource(s) 304. For example, networking devices 306 may include access points, wireless LAN controllers (WLCs), switches, routers, security devices (e.g., firewalls, etc.), access points (APs), and the like. Network resources 304 may include cloud-based services, specific servers or other endpoints, webpages, or any other resource with which sensor tag 302 could communicate.

As would be appreciated, sensor tag 302 may be of any form of available sensor tag configured to take one or more sensor measurements and report its captured sensor telemetry/measurements to the one or more resources 304 via networking device(s) 306. Example sensor measurements that sensor tag 302 may take can include, but are not limited to, any or all of the following:

Temperature Measurements
Humidity Measurements
Pressure Measurements
Detected Motion
Luminosity/Lux Measurements
Detected Smoke
Detected Carbon Monoxide
Detected Radon
Battery Charge Measurements Typically, sensor tag 302 will communicate with networking device(s) 306 using a wireless communication protocol. For example, sensor tag 302 may communicate wirelessly with a networking device 306 via Wi-Fi, Bluetooth, Bluetooth Low Energy (BLE), Zigbee, or any other suitable wireless communication protocol.

During use, sensor tag 302 may send its captured sensor measurements/telemetry to resource(s) 304 via one or more packets, as part of traffic data 310. For example, resource(s) 304 may include a monitoring application that receives traffic data 310 for ingestion and processing. In other words, the payloads of the packet(s) of traffic data 310 may include the sensor measurement/telemetry data captured by sensor tag 302. As noted above, this is typically done in a vendor proprietary manner that obfuscates the sensor measurements within the packet payloads.

Also as shown in FIG. 3 is a traffic analysis service 308 that may be hosted on one or more of networking devices 306 or be in communication therewith, either in the local network, in a remote data center, or in the cloud. Service 308 may, for example, be provided by one or more devices through the execution of traffic analysis process 248, described above. In general, traffic analysis service 308 is configured to analyze the traffic data 310 from sensor tag 302, to detect, identify, and/or process the sensor measurement(s) contained within the packet payloads of traffic data 310.

Another potential function of traffic analysis process 248 may be to operate as a data broker for the various type of sensor tags in the network. For example, once traffic analysis process 248 has identified and extracted the sensor measurement(s) 314 from the captured traffic data 310 sent by sensor tag 302, service 308 may make sensor telemetry 314 available to other resources 304a. By way of illustration, assume that sensor tag 302 is a motion sensor that reports detected motion to a resource 304 that controls smart lighting. By extracting the measured motion data from the packets of traffic data 310, traffic analysis service 308 can then share those measurements with other resource(s) 304a, such as an analytics service that was not a destination of the packets of traffic data 310. For example, the motion detection readings from sensor tag 302 can also be leveraged by a heating, ventilation, and air conditioning (HVAC) controller (e.g., to adjust the temperature of the building when unoccupied).

Figure 4:
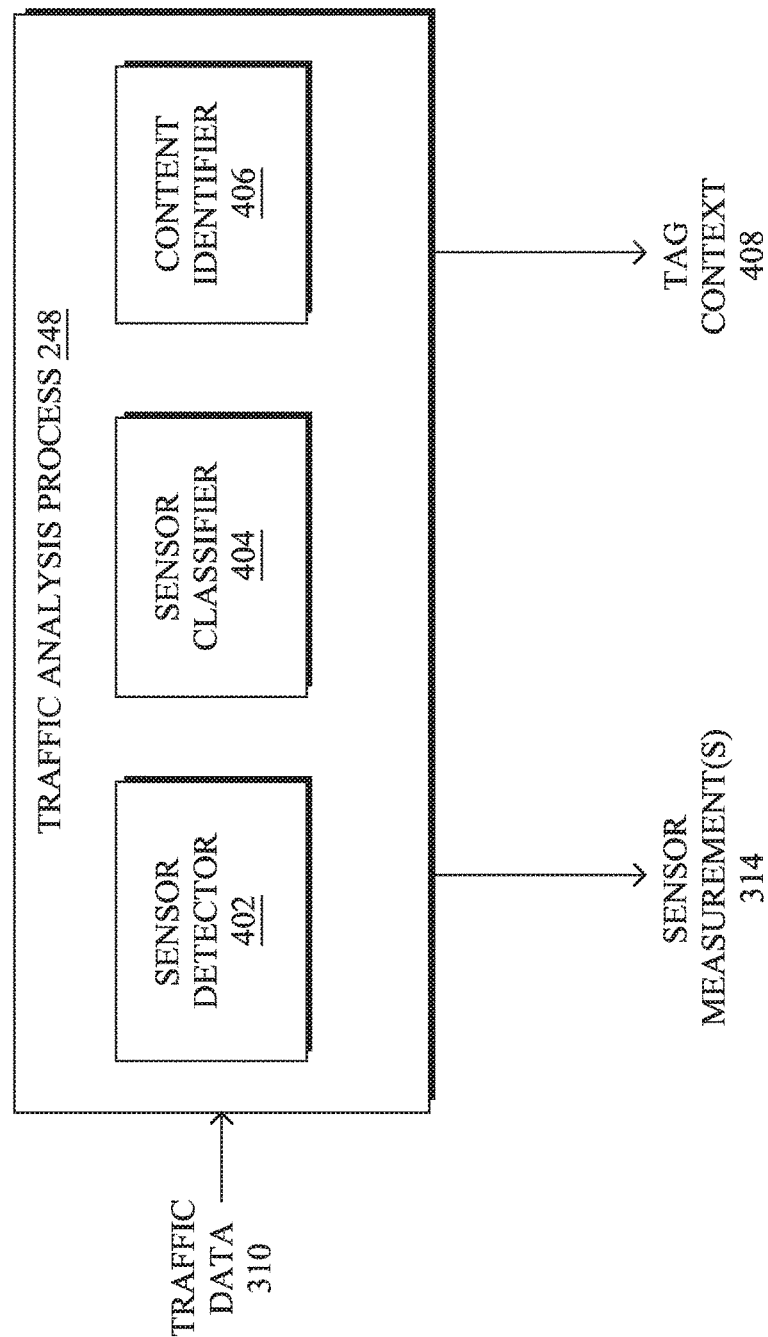
FIG. 4 illustrates an example architecture for a traffic analysis service.

FIG. 4 illustrates an example architecture 400 for performing the analysis of traffic data from a sensor tag, according to various embodiments. At the core of architecture 400 may be the following components: a sensor data 402, a sensor classifier 404, and/or a context identifier 406. Further, these components 402-406 may be implemented in a distributed manner or implemented as its own stand-alone service, either as part of the local network under observation or as a remote service. In addition, the functionalities of the components of architecture 400 may be combined, omitted, or implemented as part of other processes, as desired.

According to various embodiments, sensor detector 402 may assess traffic data 310, to determine whether a given packet sent by a sensor tag includes one or more sensor measurements. Notably, a sensor tag may comprise one or more sensors (e.g., a temperature sensor, a light sensor, etc.) whose measurements may be included by the tag in a given packet for reporting. In some embodiments, traffic data 310 may comprise the raw packet captures from the sensor tags. In other embodiments, traffic data 310 may comprise simply the extracted payloads of the packets.

While the sensor measurements by IoT sensor tags are typically reported using a vendor-proprietary data format, packets sent by sensor tags are also typically unencrypted. This is primarily due to the additional resource consumption, complexity, and cost associated with sending encrypted network traffic. Indeed, sending unencrypted network traffic can result in longer battery life of sensor tag, ease of manufacturing, and other benefits. Accordingly, while the data format may be unknown, it still becomes possible to extract the sensor measurements from the packets.

Example telemetry payloads observed for different tag vendors are shown in Table 1 below:

TABLE 1

| Tag Vendor | Payload |
| --- | --- |
| Cisco LTX (Airista) | 021b0109030964073e0200017908 |
|  | 021b0109030964073e0200017908 |
| Cisco LTX (Airista) | 021b0109030963073e0200012208 |
| Cisco LTX (Airista) | 021b0109030964073e0200017908 |
|  | 021b0109030964073e0200017908 |
| Google (Eddystone TLM) | 20000bc0208004f88046044b9944 |
| Google (Eddystone TLM) | 20000bcb174004f877cd044b926e |
| Google (Eddystone TLM) | 20000bc0204004f8805e044b994e |
| Kontakt.io | 0309021001fc3dffff3030601bf762f5d6403051118 |
| Kontakt.io | 0309021001fc41ffff2030601ca762f5d6403056420 |
| Kontakt.io | 0309021000fa40ffffc1030601c8762f5d6403050016 |

A key observation that sensor detector 402 leverages during execution is that the only varying bytes in the payload of a packet from a sensor tag correspond to the underlying sensor measurement(s). In other words, the varying bytes in the payload of one packet to the next are indicative of the measured temperature, humidity, light intensity, timestamp, battery, etc. Conversely, the static, unchanging bytes in the payload typically correspond to metadata fields according to the data format used by the vendor. For example, the payload bytes from Airista's T4 sensor tags that were observed to change across different packets are shown in bold below:

021b0109030964073e0200017908
    021b0109030963073e0200012208
    021b0109030963073f0200012709

Thus, it can be seen that the sixth byte changed (64 became 63), the eighth byte changed (3e became 3f), the twelfth byte changed (22 became 27), and the thirteenth byte changed (08 became 09) in the payloads over time. Depending on the sensor tag, adjacent payload bytes that vary may represent a sensor measurement from a single sensor of the tag or separate sensor measurements from different sensors of the tag. To help distinguish between these two cases, sensor detector 402 in its analysis of traffic data 310 may compute the joint probability of adjacent bytes appearing together versus the bytes appearing separately (e.g., sensor detector 402 may compute P(A), P(B) and P(A and B)).

In various embodiments, once sensor detector 402 has identified the varying payload bytes from a sensor, sensor detector 402 may generate a signature for the payload that indicates which bytes are static and which bytes are variable. For example, in the above case of T4 sensor tags, sensor detector 402 may generate a signature of the following form:

021b01090309<1 Byte>07<1 Byte>020001<1 Byte><1 Byte>

Note that in the above signature, only the variable bytes are marked separately, irrespective of whether they vary together or not.

To generate a final payload signature for a sensor tag, sensor detector 402 may then cross-validate the payload signatures across different packets in an attempt to discern a common signature. For example, in various embodiments, sensor detector 402 may aggregate the payload signatures based on 75% per-tag signature matching and probabilities of per tag individual and combined sensor bytes. Thus, the final combined signature for the above payloads may end up being of the final form:

021b01090309<1 Byte>07<1 Byte>0200<1 Byte><1 Byte><1 Byte>

In other words, sensor detector 402 may be unable to determine conclusively whether the adjacent variable byes correspond to the same sensor/sensor measurement or different ones. Accordingly, sensor detector 402 may mark all of the logical byte combinations as different sensors, leaving it to sensor classifier 404 to determine which among the different possible combinations most likely represent a sensor measurement value.

Once sensor detector 402 has determined a finalized signature for the packet payloads of a sensor tag, it may leverage sensor classifier 404 to identify the sensor type(s) of an unknown sensor tag. In various embodiments, sensor classifier 404 may comprise a machine learning classifier that has been trained to discern the type of sensor/sensor measurement within a payload. Example forms of machine learning classifiers that may be suitable for this task include, but are not limited to, linear regression classifiers, support vector machine-based classifiers, K-Nearest Neighbor (KNN) classifiers, naïve Bayesian classifiers, decision tree-based classifiers, random forest-based classifiers, classification and regression trees (CART)-based classifiers, and the like.

In general, training of sensor classifier 404 may be performed in a supervised or semi-supervised manner. Accordingly, the classifier model may be trained by labeling training data from sensor tags of known types. In turn, the trained classifier can be used to classify unlabeled data from unknown sensor tags in the network. In various embodiments, the input to the classifier for purposes of both model training and for traffic analysis in a live network may comprise features extracted by sensor classifier 404 from the payload data of traffic data 310. For example, sensor classifier 404 may generate any or all of the following payload features for classifier input:

- Distribution matching information (e.g., by applying two-sample Kolmogoruv-Smirnov testing)
- Byte range
- Standard deviation and/or total deviation over time
- Maximum consecutive deviation
- Whether the byte variations are incremental or decremental
- Stability measure
- Whether the byte variations are Boolean in nature In other words, sensor classifier 404 may identify a series of one or more varying payload bytes as being associated with a particular sensor type/sensor measurement, based on the extracted features for those one or more bytes over time. For example, based on how a certain byte changes between packets from the tag, sensor classifier 404 may determine that the byte is associated with a temperature sensor and conveys a temperature measurement.

To test the efficacy of the above classification approach, Airista LTX T4 and Onyx sensor tags equipped with temperature, humidity, motion, light intensity, and battery sensors were used to generate labeled training data. In turn, the training data was used to train five different classifiers: a linear regression classifier, an SVM classifier, a KNN classifier, a naïve Bayesian classifier, and a CART-based classifier. Each of these classifiers was then validated against packets from Kontakt.io BP16-3 sensor tags.

Using the above signature generation approach, eleven bytes from the BP16-3 sensor tags were identified as possibly being associated with sensors/sensor measurements with an accuracy of 98%. In turn, the trained classifiers were then able to identify three of these eleven bytes as representing temperature, light intensity, and battery measurements with a peak accuracy of 95.7%. More specifically, the different classifier types exhibited the following performances:

TABLE 2

| Classifier Type | Mean Accuracy | Standard Deviation |
| --- | --- | --- |
| Linear Regression | 0.9543398971562317 | 0.0038377463589059227 |
| SVM | 0.9570256321473615 | 0.003346987332071485 |
| KNN | 0.9475982312247974 | 0.007048681928123975 |
| Naive Bayesian | 0.9136296847489472 | 0.005484058001675035 |
| CART | 0.9570256321473616 | 0.003346987332071485 |

Thus, the overall confidence in accurately predicting the bytes representing temperature, light intensity, and battery measurements in the proprietary Kontakt.io data format is P(detection)*P(identification)=93.7%, proving that the above approach is capable of discerning sensor measurements within the proprietary Kontakt.io payload data format.

Figure 5B:
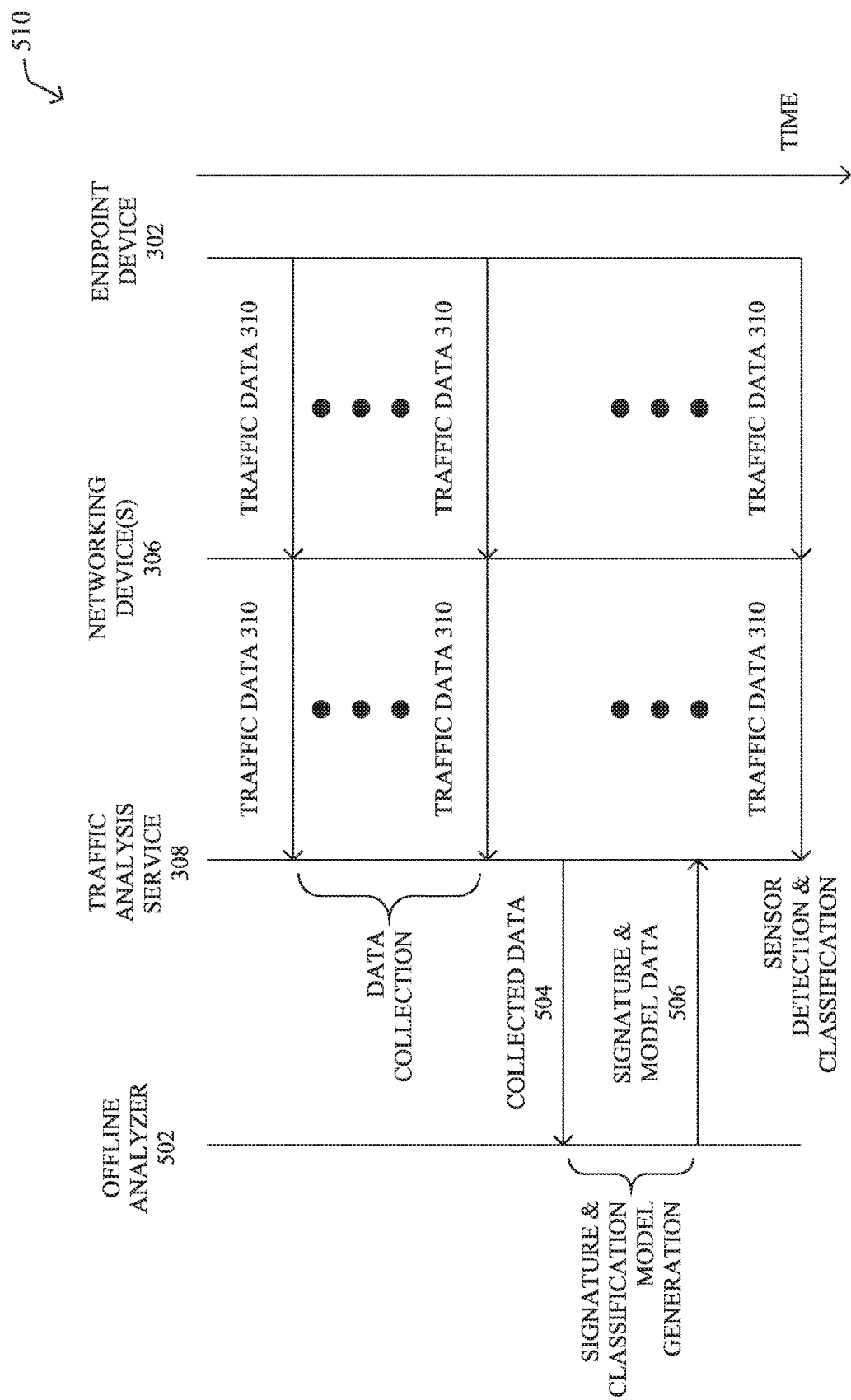

Referring briefly to FIGS. 5A-5B, two possible scenarios are envisioned with respect to the signature and classifier model generation. In diagram 500 in FIG. 5A, the signature and classifier model generation can be performed in an online manner, with the signatures and model being build in real-time as more and more traffic data 310 is collected. As a result, however, the initial classification accuracy is relatively low (e.g., below a desired threshold) for a period of time. As a positive, though, the online approach has no setup delay.

FIG. 5B illustrates a diagram 510 of the offline generation of the signatures and classifier model, in a further embodiment. As shown, the traffic data 310 may be collected for a period of time (e.g., by networking device(s) 306, traffic analysis service 308, etc.) and sent as collected data 504 to an offline analyzer 502 (e.g., an offline form of architecture 400). In turn, the offline analyzer 502 may perform the signature and classification model generation steps and return the resulting signature and model data 506 to traffic analysis service 308. From this point onward, traffic analysis service 308 can then use the generated signature and model data 506 to assess the live traffic data 310 observed in the network.

Referring again to FIG. 4, traffic analysis process 248 may further include a context identifier 406. In various embodiments, context identifier 406 may be configured to use the results of sensor classifier 404 to extract out the actual sensor measurement(s) 314 from the payloads of traffic data 310 and/or identify the context 408 of the source sensor tag. In general, the context of a sensor tag may indicate its deployment location and/or use within the network.

By way of example, assume that sensor classifier 404 has determined that the fifth payload byte from a particular sensor tag corresponds to temperature readings from a temperature sensor of that tag. In such a case, context analyzer 406 may extract out the temperature measurements and assess their values, to determine the context of the tag. For example, assume that the sensor readings have a value around −17 and fluctuate within a relatively limited range (e.g., +/−1). Based on this extracted temperature data, context identifier 406 may predict that the tag context 408 for the sensor tag is within a freezer, with a certain degree of confidence.

Other example contexts that context identifier 406 may predict can include, but are not limited to, the specific location or use of the sensor tag (e.g., in a freezer, in an office room, outside, in an oven, etc.), whether the sensor tag is in motion or not, the environmental conditions surrounding the tag (e.g., in sunlight, in-room, in darkness, etc.). To make the context predictions, context identifier 406 could leverage known heuristics, machine learning, and/or additional information about the traffic data 310, such as RSSI or timestamp information, as well.

While the above approach is effective in many cases, it also exhibits the following limitations:

1. Sensors that provide Boolean outputs, such as light vs. no light, motion vs. no motion, can be detected, but most likely not identified. In other words, the service may determine that the corresponding byte in the payload that takes on a Boolean value is some form of sensor, but may not be able to determine the exact type of the sensor. To address this, in some embodiments, additional correlation between these measurements and any other measurements present in the payload data could be correlated. For example, even if a motion sensor output takes on a Boolean value, it can be correlated with RSSI fluctuations and identified, in some cases.
2. Components of a particular type of sensor may also be unidentifiable by the above approach. For example, if a particular sensor measurement relates to the acceleration of the sensor tag, the underlying x, y, and z coordinate measurements taken by the components of the accelerometer may be unidentifiable.
3. Adjacent bytes in the payload require additional iterations of processing. For example, in the case of the payload being 021b0109030963073e0200012208, as in the example used previously, the frequency of the byte variations can be used to predict whether bytes 22 and 08 represent a single sensor/sensor measurement or two different sensors. If the system is unable to make this prediction, the system can still function under the assumption that 22, 08, and 2208 are three different sensors for purposes of classification. Doing so will lead to low initial prediction accuracies. However, with enough traffic data 310 collected over time, the accuracy can still be improved somewhat.
4. If the measurements of a sensor occupy multiple bytes but only one byte varies, the sensor will be detected and identified but the value predicted will be wrong. This can also be fixed by calibration, as described below. Further, by collecting data in different environments (e.g., in a freezer, in a microwave, outdoors vs. indoors, etc.), sufficient variation can be collected for each sensor type, as well.

In various embodiments, the first two limitations above can be mitigated possibly through manual intervention. For example, a user could notify the traffic analysis service through some form of communication (e.g., REST API, a user interface, etc.) the types of sensor(s) present in the sensor tag. This drastically cuts down to the search space for purposes of identifying the type of sensor(s) on the tag. Indeed, if the end user is already aware of the types of sensor(s) present on a particular type of sensor tag, user input can be obtained by the service, to aid in its analysis of the packets from the tag. In such a case, the user could upload a list of sensors in the tag via a graphical user interface, command line interface, or the like. As a result, the possible set of sensors/sensor measurements that can be identified by sensor classifier 404 can be vastly reduced, leading to faster classification.

Figure 6:
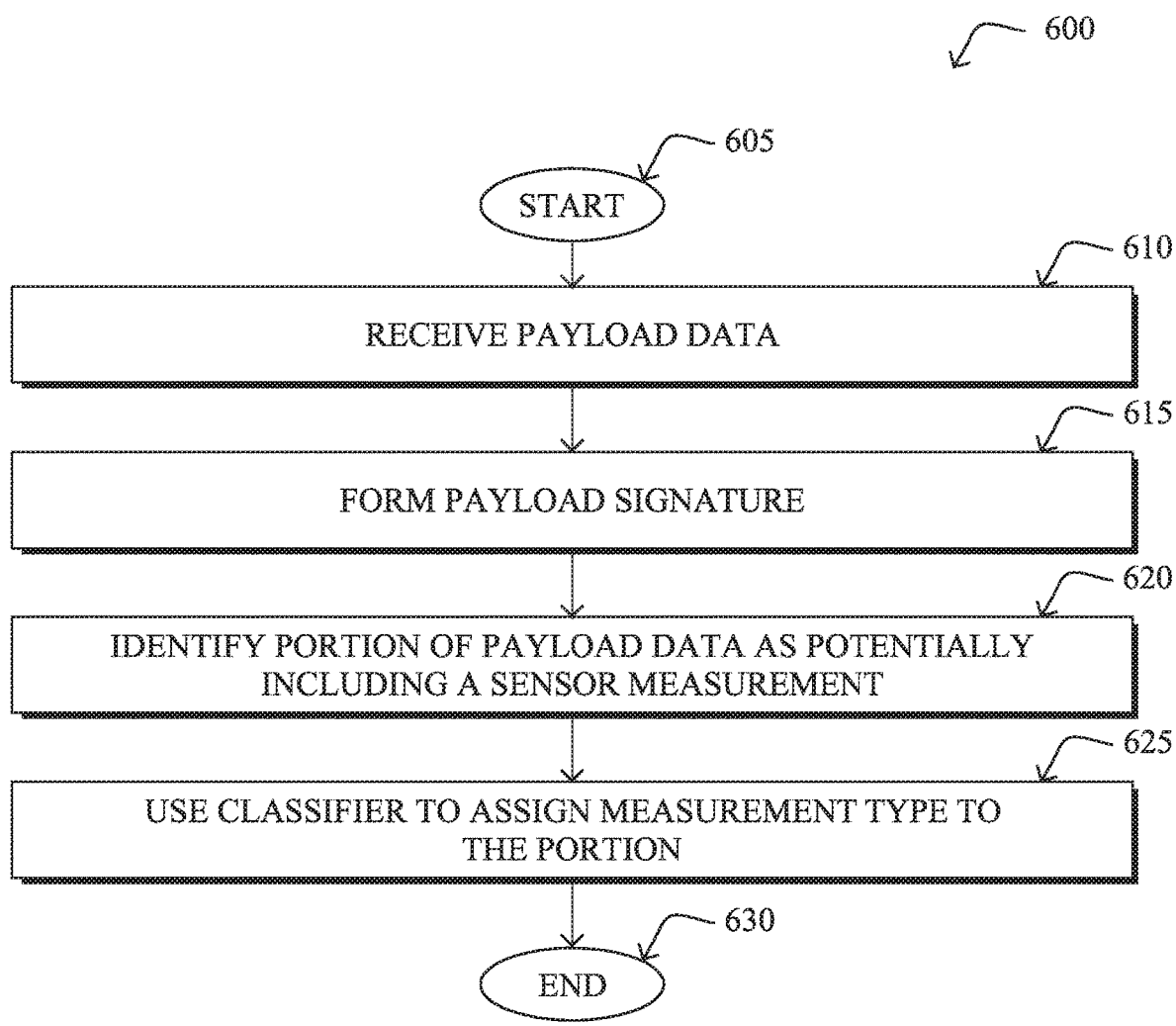
FIG. 6 illustrates an example simplified procedure for identifying and classifying a type of sensor measurement included in a packet payload from a sensor tag.

FIG. 6 illustrates an example simplified procedure for FIG. 6 illustrates an example simplified procedure for identifying and classifying a type of sensor measurement included in a packet payload from a sensor tag, in accordance with one or more embodiments described herein. For example, a non-generic, specifically configured device (e.g., device 200) may perform procedure 700 by executing stored instructions (e.g., process 248), to provide a traffic analysis service to one or more networks. The procedure 600 may start at step 605, and continues to step 610, where, as described in greater detail above, the traffic analysis service may receive payload data from packets sent by a sensor tag in a network. In various embodiments, the service may receive copies of the packets captured in the network, the extracted payloads of the packets, or even operate on the original packets themselves.

At step 615, as detailed above, the service may form a payload signature for the sensor tag, based on the payload data. In various embodiments, the payload signature is indicative of one or more bytes in the payload that vary across the packets. For example, the third byte in the payloads of the packets sent by the sensor tag may vary over time, while other portions of the payload data remain static.

At step 620, the service may identify a portion of the payload data as potentially including a sensor measurement, based on the payload signature, as described in greater detail above. More specifically, the service may identify one or more varying adjacent bits in the payload data as potentially including a sensor measurement.

At step 625, as detailed above, the service may use a machine learning classifier to assign a sensor measurement type to the identified portion of the payload data. In various embodiments, the service may do so by first determining a set of statistical features of the payload data (e.g., a standard deviation, a deviation over time, etc.) and then using the set of features as input to the machine learning classifier. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the identification of sensor measurements within the payloads of packets sent by a sensor tag without requiring knowledge of the data format used by the vendor/manufacturer of the tag.

While there have been shown and described illustrative embodiments that provide for the analysis of packets sent by a sensor tag, it is to be understood that various other adaptations and modifications may be made within the spirit and scope of the embodiments herein. For example, while certain embodiments are described herein with respect to using certain models for purposes of sensor/sensor measurement type classification, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a traffic analysis service, payload data from packets sent by a sensor tag in a network;
   forming, by the service, a payload signature for the sensor tag, based on the payload data, wherein the payload signature is indicative of one or more bytes in the payload that vary across the packets;
   identifying, by the service, a portion of the payload data including a sensor measurement, based on the payload signature; and
   using, by the service, a machine learning classifier to assign a sensor measurement type to the identified portion of the payload data.

2. The method as in claim 1, further comprising:
   extracting, by the service, a sensor measurement from the identified portion of the payload data, based in part on its assigned sensor measurement type.

3. The method as in claim 2, further comprising:
   providing, by the traffic analysis service, the extracted sensor measurement to an analytics service that was not a destination of the one or more packets sent by the sensor tag.

4. The method as in claim 1, wherein identifying the portion of the payload data including a sensor measurement, based on the payload signature, comprises:
   forming a payload signature for the packets sent by the sensor tag that is indicative of varying payload bytes in the packets.

5. The method as in claim 4, wherein using the machine learning classifier to assign a sensor measurement type to the identified portion of the payload data comprises:
   determining a set of statistical features of the payload data; and
   using the set of features as input to the machine learning classifier.

6. The method as in claim 1, wherein the sensor measurement type is indicative of at least one of: a measured temperature, a measured humidity, a measured battery charge, or a measured luminosity.

7. The method as in claim 1, wherein the sensor tag sends the one or more packets via the network using Wi-Fi or Bluetooth Low Energy (BLE).

8. The method as in claim 1, wherein the service uses the machine learning classifier to assign a sensor measurement type to the identified portion of the payload based in part on user input that specifies one or more sensor measurement types for the sensor tag.

9. The method as in claim 1, further comprising:
   determining a context for the sensor tag, based on the payload data.

10. An apparatus, comprising:
    one or more network interfaces to communicate with one or more networks;
    a processor coupled to the network interfaces and configured to execute one or more processes; and
    a memory configured to store a process executable by the processor, the process when executed configured to:
    receive payload data from packets sent by a sensor tag in a network;
    form a payload signature for the sensor tag, based on the payload data, wherein the payload signature is indicative of one or more bytes in the payload that vary across the packets;
    identify a portion of the payload data including a sensor measurement, based on the payload signature; and
    use a machine learning classifier to assign a sensor measurement type to the identified portion of the payload data.

11. The apparatus as in claim 10, wherein the process when executed is further configured to:
    extract a sensor measurement from the identified portion of the payload data, based in part on its assigned sensor measurement type.

12. The apparatus as in claim 11, wherein the process when executed is further configured to:
    provide the extracted sensor measurement to an analytics service that was not a destination of the one or more packets sent by the sensor tag.

13. The apparatus as in claim 10, wherein the apparatus identifies the portion of the payload data including a sensor measurement, based on the payload signature, by:
    forming a payload signature for the packets sent by the sensor tag that is indicative of varying payload bytes in the packets.

14. The apparatus as in claim 13, wherein the apparatus uses the machine learning classifier to assign a sensor measurement type to the identified portion of the payload data by:
- determining a set of statistical features of the payload data; and
- using the set of features as input to the machine learning classifier.

15. The apparatus as in claim 10, wherein the sensor measurement type is indicative of at least one of: a measured temperature, a measured humidity, a measured battery charge, or a measured luminosity.

16. The apparatus as in claim 10, wherein the sensor tag sends the one or more packets via the network using Wi-Fi or Bluetooth Low Energy (BLE).

17. The apparatus as in claim 10, wherein the service uses the machine learning classifier to assign a sensor measurement type to the identified portion of the payload based in part on user input that specifies one or more sensor measurement types for the sensor tag.

18. The apparatus as in claim 10, wherein the process when executed is further configured to:
- determine a context for the sensor tag, based on the payload data.

19. A tangible, non-transitory, computer-readable medium storing program instructions that cause a traffic analysis service to execute a process comprising:
- receiving, at the traffic analysis service, payload data from packets sent by a sensor tag in a network;
- forming, by the service, a payload signature for the sensor tag, based on the payload data, wherein the payload signature is indicative of one or more bytes in the payload that vary across the packets;
- identifying, by the service, a portion of the payload data including a sensor measurement, based on the payload signature; and
- using, by the service, a machine learning classifier to assign a sensor measurement type to the identified portion of the payload data.

20. The computer-readable medium as in claim 19, wherein identifying the portion of the payload data including a sensor measurement, based on the payload signature, comprises:
- forming a payload signature for the packets sent by the sensor tag that is s indicative of varying payload bytes in the packets.

* * * * *